(12) United States Patent
Elliot et al.

(10) Patent No.: US 10,706,872 B2
(45) Date of Patent: *Jul. 7, 2020

(54) WIRELESS AUDIO SYNCHRONIZATION

(71) Applicant: Bose Corporation, Framingham, MA (US)

(72) Inventors: Michael Elliot, North Grafton, MA (US); Debasmit Banerjee, Framingham, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,330

(22) Filed: Sep. 30, 2019

(65) Prior Publication Data

US 2020/0035258 A1 Jan. 30, 2020

Related U.S. Application Data

(63) Continuation of application No. 16/298,788, filed on Mar. 11, 2019, now Pat. No. 10,453,474, which is a
(Continued)

(51) Int. Cl.
*G10L 21/04* (2013.01)
*G10L 19/26* (2013.01)
(Continued)

(52) U.S. Cl.
CPC .............. *G10L 21/04* (2013.01); *G10L 19/26* (2013.01); *H04N 21/4307* (2013.01);
(Continued)

(58) Field of Classification Search
CPC ....... G10L 21/04; G10L 19/26; H04R 29/007; H04R 2420/07; H04R 2227/003; H04R 2227/005; H04N 21/4307; H04N 21/8106
See application file for complete search history.

(56) References Cited

U.S. PATENT DOCUMENTS 6,259,677 B1 * 7/2001 Jain ....................... H04J 3/0632
370/252
9,661,425 B2 * 5/2017 Solum ................... H04R 25/554
(Continued)

FOREIGN PATENT DOCUMENTS

CN 101731011 A 6/2010
CN 103947183 A 7/2014
(Continued)

OTHER PUBLICATIONS

Office Action dated Nov. 5, 2019 from the China National Intellectual Property Administration for CN Application No. 201680065078.9.
(Continued)

*Primary Examiner* — Lewis G West
(74) *Attorney, Agent, or Firm* — Brian M. Dingman; Dingman IP Law, PC

(57) ABSTRACT

A method of synchronizing playback of audio data sent over a first wireless network from an audio source to a wireless speaker package that is adapted to play the audio data. The method includes comparing a first time period over which audio data was sent over the first wireless network to a second time period over which the audio data was received by the wireless speaker package, and playing the received audio data on the wireless speaker package over a third time period that is related to the comparison of the first and second time periods.

20 Claims, 3 Drawing Sheets

Related U.S. Application Data continuation of application No. 16/025,136, filed on Jul. 2, 2018, now Pat. No. 10,242,693, which is a continuation of application No. 15/880,869, filed on Jan. 26, 2018, now Pat. No. 10,014,001, which is a continuation of application No. 14/848,212, filed on Sep. 8, 2015, now Pat. No. 9,911,433.

(51) Int. Cl.
*H04N 21/43* (2011.01)
*H04R 29/00* (2006.01)
*H04N 21/81* (2011.01)

(52) U.S. Cl.
CPC ....... *H04N 21/8106* (2013.01); *H04R 29/007* (2013.01); *H04R 2227/003* (2013.01); *H04R 2227/005* (2013.01); *H04R 2420/07* (2013.01)

(56) References Cited

U.S. PATENT DOCUMENTS

| | | | |
|---|---|---|---|
| 9,911,433 B2* | 3/2018 | Elliot | G10L 19/26 |
| 10,014,001 B2* | 7/2018 | Elliot | G10L 21/04 |
| 2008/0291863 A1* | 11/2008 | Agren | H04J 3/0632 370/315 |
| 2010/0295993 A1* | 11/2010 | Oh | H04N 5/04 348/516 |
| 2015/0026006 A1* | 1/2015 | Jackson | G01C 21/343 705/26.8 |
| 2016/0196106 A1* | 7/2016 | Hammer | H04R 3/12 381/79 |
| 2017/0195769 A1* | 7/2017 | Chang | H04R 1/1041 |

FOREIGN PATENT DOCUMENTS

| | | |
|---|---|---|
| CN | 104079363 A | 10/2014 |
| WO | 2014/142203 A1 | 9/2014 |

OTHER PUBLICATIONS

English Translation of Office Action dated Nov. 5, 2019 from the China National Intellectual Property Administration for CN Application No. 201680065078.9.

Office Action dated Apr. 1, 2020 by the China National Intellectual Property Administration for Chinese Patent Application No. 201680065078.9.

* cited by examiner

WIRELESS AUDIO SYNCHRONIZATION

CROSS-REFERENCE TO RELATED APPLICATIONS

This application is a continuation of application Ser. No. 16/298,788, filed on Mar. 11, 2019, which is a continuation of application Ser. No. 16/025,136, filed on Jul. 2, 2018 (now U.S. Pat. No. 10,242,693 issued on Mar. 26, 2019), which is a continuation of application Ser. No. 15/880,869, filed on Jan. 26, 2018 (now U.S. Pat. No. 10,014,001 issued on Jul. 3, 2018), which is a continuation of application Ser. No. 14/848,212, filed on Sep. 8, 2015 (now U.S. Pat. No. 9,911,433 issued on Mar. 6, 2018). Priority of the prior application and the prior issued patents are claimed.

BACKGROUND

This disclosure relates to synchronizing audio data sent wirelessly from a source to a sink.

The Bluetooth standard does not provide a means to synchronize or rate-match the clocks in an audio source and an audio sink. Bluetooth sources vary dramatically in their data rate, packet size, and duration of audio per packet. The radio frequency (RF) environment can also contribute to variation in audio data packet arrival times at the sink. Most Bluetooth-enabled audio sinks (such as wireless speaker packages) have a fixed latency (i.e., buffer depth) to account for these inconsistencies. However, if the latency is greater than about 100 milliseconds the audio part of an audio/video playback noticeably lags the video. The out of sync lip movement that results is objectionable to most users.

SUMMARY

The latency of playback of audio data by a wireless speaker package or another Bluetooth audio sink can be minimized by allowing the latency to vary based on the difference between the time it takes to send audio packets and the time over which these audio packets are received by the sink. This way, when jitter is low there is low latency and when jitter increases the latency increases. For networked systems with multiple audio sinks, one sink can function as the master and the rest can function as slaves. The master can time stamp the audio packets before they are sent to the slaves such that all of the devices play back synchronously.

All examples and features mentioned below can be combined in any technically possible way.

In one aspect, a method of synchronizing playback of audio data sent over a first wireless network from an audio source to a wireless speaker package that is adapted to play the audio data includes comparing a first time period over which audio data was sent over the first wireless network to a second time period over which the audio data was received by the wireless speaker package, and playing the received audio data on the wireless speaker package over a third time period that is related to the comparison of the first and second time periods.

Embodiments may include one of the following features, or any combination thereof The first wireless network may comprise a network that does not provide a means to synchronize or rate match the clocks in the audio source and the wireless speaker package. The first wireless network may be a Bluetooth network. The comparison may comprise a function of the second time period and the first time period. The audio data may be sent over the first wireless network as discrete audio data packets that are each sent over a discrete data packet time period, wherein the first time period comprises the discrete data packet time period. The third time period may be based on the discrete data packet time period and the function of the second time period and the first time period. The received audio data packets may be played on the wireless speaker package over the third time period. The method may further comprise modifying a buffer depth on the wireless speaker package when the difference between the third time period and the second time period changes (e.g., when it exceeds a threshold value).

Embodiments may include one of the following features, or any combination thereof The method may further comprise sending the received audio data over a second wireless network from the wireless speaker package to one or more additional wireless speaker packages for synchronized playback of the received audio data over the third time period on the wireless speaker package and the additional wireless speaker packages. The audio data may be sent over the first wireless network as discrete audio data packets, and the method may further comprise time stamping audio data packets with a sent time stamp when they are sent over the first wireless network and also time stamping received audio data packets with a receive time stamp when they are received by the wireless speaker package, where the receive time stamp represents a local time on the wireless speaker package when the associated one of the individual data packets was received by the wireless speaker package. The first time period may be based on the sent time stamp of audio data packets and the second time period may be based on the receive time stamp of the same audio data packets.

Embodiments may include one of the following features, or any combination thereof. The audio data may be sent over the first wireless network as discrete audio data packets, and the method may further comprise adding to the packets a time offset that is based on the comparison of the first and second time periods. The method may further comprise sending the received audio data packets along with the receive stamps for the packets over a second wireless network from the wireless speaker package to one or more additional wireless speaker packages, to facilitate synchronized playback of the audio data packets on the wireless speaker package and the additional wireless speaker packages.

Embodiments may include one of the following features, or any combination thereof. The audio data may be sent over the first wireless network as discrete audio data packets, and the method may further comprise playing each of the received audio data packets on the wireless speaker package over the third time period. The third time period may be variable, and the method may further comprise scaling the third time period based on a time between receipt of packets by the wireless speaker package.

Embodiments may include one of the following features, or any combination thereof. The method may further comprise applying a smoothing function to received audio data before it is played, to reduce audio artifacts due to differences between the first and third time periods. The method may further comprise storing in a memory of the wireless speaker package, information from which the third time period can be derived. After the audio source and the wireless speaker package have been disconnected and then reconnected over the first wireless network, this information may be retrieved from memory, and the retrieved information and the current values of the first and second time periods can then be used to generate the third time period over which received audio data is played on the wireless speaker package. The method may further comprise modifying the third time period after it has been retrieved, based on the first and second time periods.

In another aspect, a wireless speaker package includes an electro-acoustic transducer, a processor, and memory comprising instructions which when executed by the processor cause the wireless speaker package to compare a first time period over which audio data was sent to the wireless speaker package over a first wireless network to a second time period over which the audio data was received by the wireless speaker package and play the received audio data on the wireless speaker package over a third time period that is related to the comparison of the first and second time period.

Embodiments may include one of the following features, or any combination thereof. The first wireless network may comprise a network that does not provide a means to synchronize or rate match the clocks in the audio source and the wireless speaker package. The first wireless network may be a Bluetooth network. The comparison may comprise a function of the second time period and the first time period. The audio data may be sent over the first wireless network as discrete audio data packets that are each sent over a discrete data packet time period, wherein the first time period comprises the discrete data packet time period. The third time period may be based on the discrete data packet time period and the function of the second time period and the first time period. The received audio data packets may be played on the wireless speaker package over the third time period. The method may further comprise modifying a buffer depth on the wireless speaker package when the difference between the third time period and the second time period changes (e.g., when it exceeds a threshold value).

Embodiments may include one of the following features, or any combination thereof. The method may further comprise sending the received audio data over a second wireless network from the wireless speaker package to one or more additional wireless speaker packages for synchronized playback of the received audio data over the third time period on the wireless speaker package and the additional wireless speaker packages. The audio data may be sent over the first wireless network as discrete audio data packets, and the method may further comprise time stamping audio data packets with a sent time stamp when they are sent over the first wireless network and also time stamping received audio data packets with a receive time stamp when they are received by the wireless speaker package, where the receive time stamp represents a local time on the wireless speaker package when the associated one of the individual data packets was received by the wireless speaker package. The first time period may be based on the sent time stamp of audio data packets and the second time period may be based on the receive time stamp of the same audio data packets.

Embodiments may include one of the following features, or any combination thereof. The audio data may be sent over the first wireless network as discrete audio data packets, and the method may further comprise adding to the packets a time offset that is based on the comparison of the first and second time periods. The method may further comprise sending the received audio data packets along with the receive stamps for the packets over a second wireless network from the wireless speaker package to one or more additional wireless speaker packages, to facilitate synchronized playback of the audio data packets on the wireless speaker package and the additional wireless speaker packages.

Embodiments may include one of the following features, or any combination thereof. The audio data may be sent over the first wireless network as discrete audio data packets, and the method may further comprise playing each of the received audio data packets on the wireless speaker package over the third time period. The third time period may be variable, and the method may further comprise scaling the third time period based on a time between receipt of packets by the wireless speaker package.

Embodiments may include one of the following features, or any combination thereof. The method may further comprise applying a smoothing function to received audio data before it is played, to reduce audio artifacts due to differences between the first and third time periods. The method may further comprise storing in a memory of the wireless speaker package, information from which the third time period can be derived. After the audio source and the wireless speaker package have been disconnected and then reconnected over the first wireless network, this information may be retrieved from memory, and the retrieved information and the current values of the first and second time periods can then be used to generate the third time period over which received audio data is played on the wireless speaker package. The method may further comprise modifying the third time period after it has been retrieved, based on the first and second time periods.

DETAILED DESCRIPTION

The latency of playback of audio data by a wireless speaker package or another type of Bluetooth audio sink can be minimized by allowing the latency to vary based on the jitter, or the difference between the time it takes for the source to send audio packets and the time over which these audio packets are received by the sink. This way, when jitter is low there is low latency and when jitter increases the latency increases. For networked systems with multiple audio sinks, one sink can communicate with the source and function as a master device. The rest of the devices can function as slaves. The master can time stamp the audio packets before they are sent to the slaves, taking the latency into account, such that all of the devices play the audio back synchronously.

Figure 1:
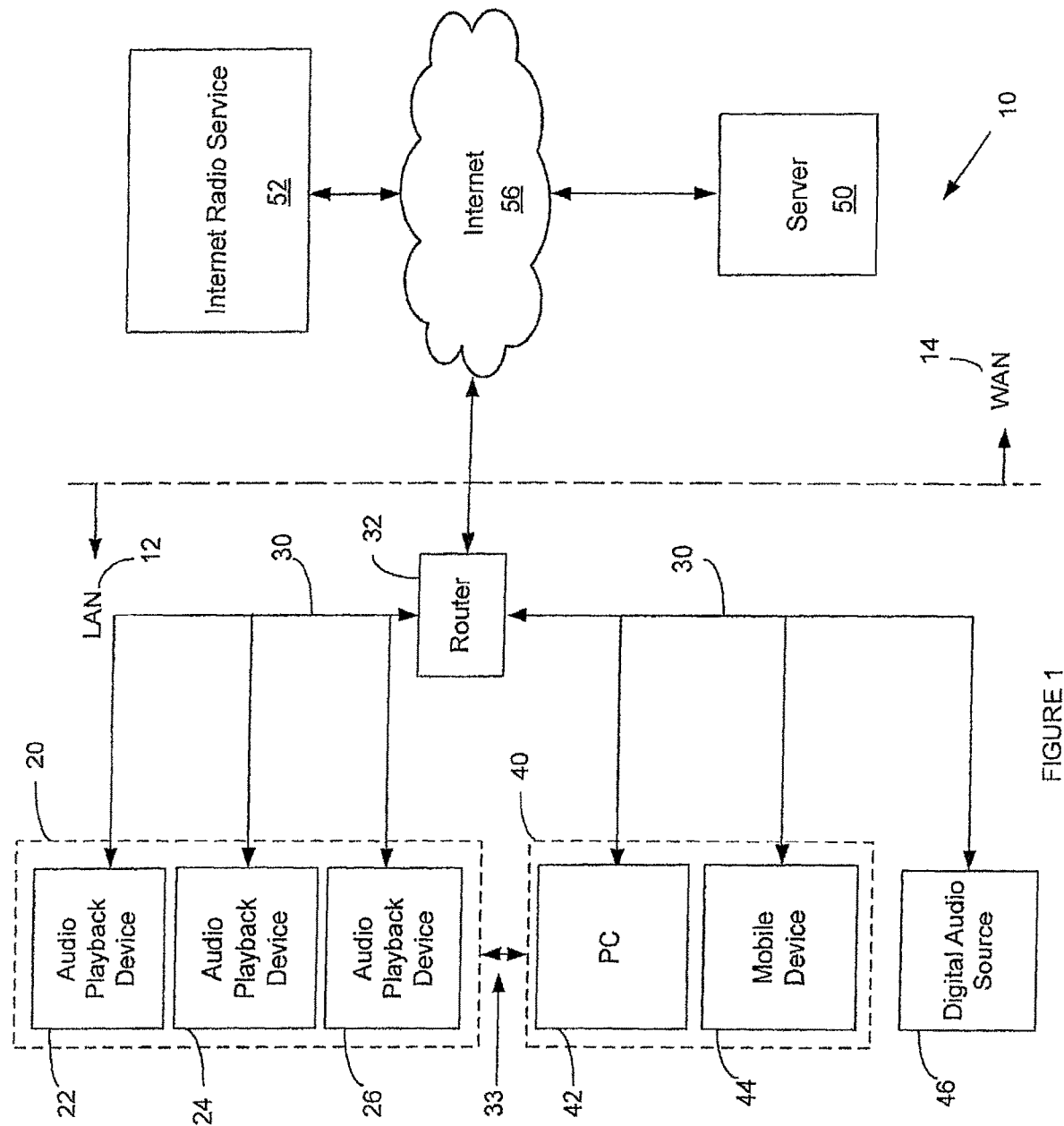
FIG. 1 is a schematic block diagram of an audio distribution system that can be used in the present method, and includes an audio source and a wireless speaker package according to this disclosure.

Audio distribution system 10, FIG. 1, can be used to accomplish wireless audio synchronization, and also includes non-limiting examples of wireless speaker packages and other wireless audio sources and sinks that can be involved in this wireless audio synchronization. System 10 is adapted to deliver digital audio (e.g., digital music). System 10 includes a number of audio playback devices 22, 24 and 26 which are among the group of audio output devices 20 of the system. In one non-limiting embodiment, the audio playback devices are identical wireless speaker packages that each include a digital to analog converter that is able to receive digital audio signals and convert them to analog form. The wireless speaker packages also include an electro-acoustic transducer that receives the analog audio signals and transduces them into sound. The wireless speaker packages also include a processor. The wireless speaker packages can be connected to one another and also connected to the router/access point 32 via network 30. The wireless speaker packages are thus able to communicate with one another. Network 30 can be a wired and/or wireless network, and can use known network connectivity methodologies. Network 30 is part of local area network (LAN) 12 which is connected to wide area network (WAN) 14, in this non-limiting example by connection to Internet 56. LAN 12 also includes one or more separate computing devices 40 and/or one or more separate local digital audio sources 46. In this non-limiting example the computing devices include a personal computer 42 and a mobile computing device 44 such as a smartphone, tablet or the like. One or more of computing devices 40 may be connected to one or more of audio output devices 20 by a personal area network (PAN) 33 (e.g., a wireless PAN). PAN 33 preferably comprises a direct point-to-point Bluetooth connection between mobile device 44 and one of audio playback devices 22, 24 or 26. WAN 14 includes server 50 and Internet radio service 52 which can both communicate with LAN 12 via Internet 56.

One use of system 10 is to play an audio stream over one or more of the audio playback devices in group 20. The sources of digital audio provide access to content such as audio streams that move over network 30 and/or network 33 to the audio playback devices. The sources of such audio streams can include, for example, Internet radio stations and user defined playlists. Each of such digital audio sources maintains a repository of audio content which can be chosen by the user to be played over one or more of the audio playback devices. Such digital audio sources can include Internet-based music services such as Pandora®, Spotify® and vTuner®, for example. Network attached storage devices such as digital audio source 46, and media server applications such as may be found on a mobile computing device, can also be sources of audio data. Typically, the user selects the audio source and the playback devices via PC 42 and/or mobile device 44.

Figure 2:
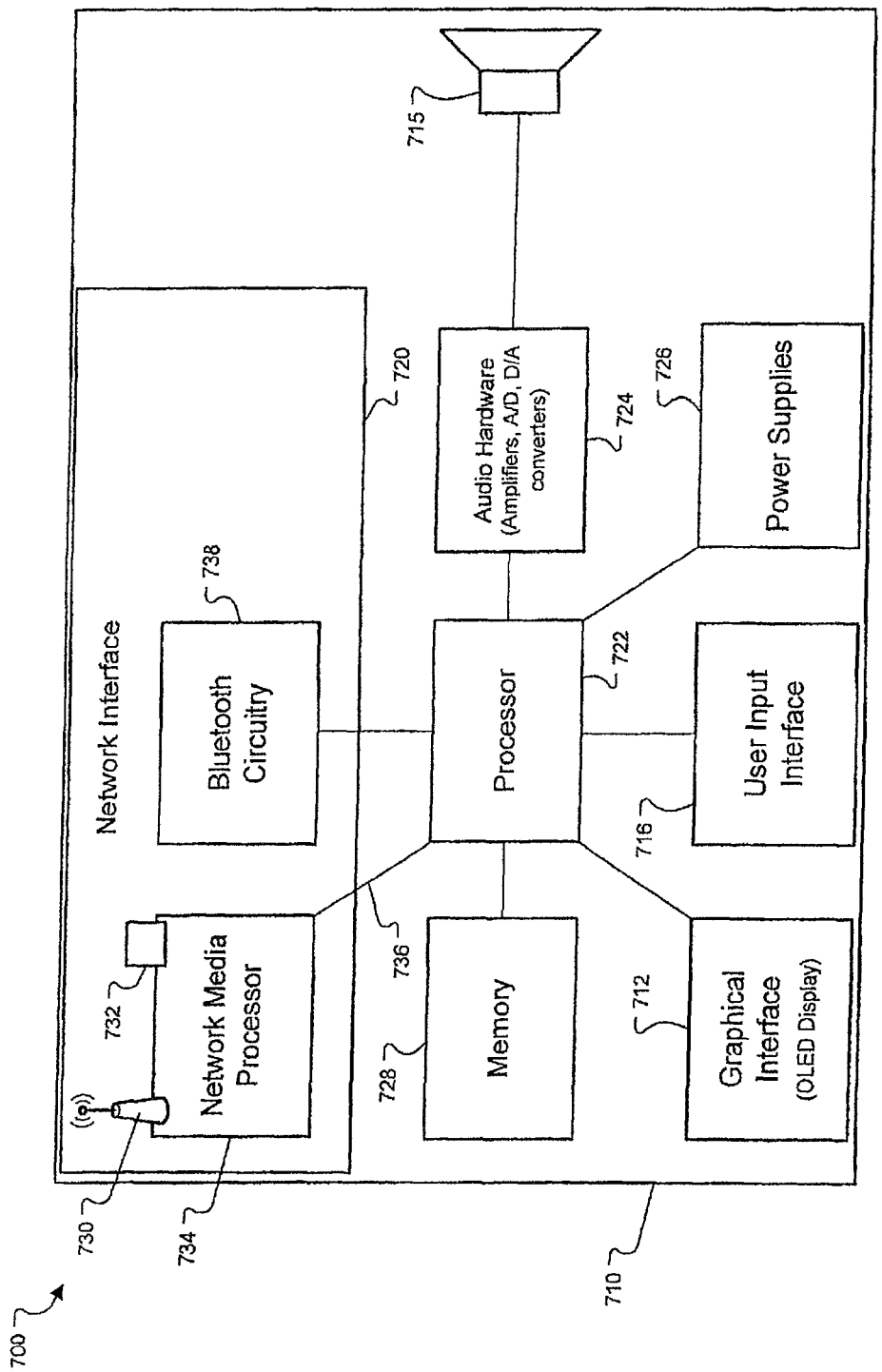
FIG. 2 is a block diagram of an exemplary wireless speaker package.

FIG. 2 illustrates an exemplary wireless speaker package as an example of this disclosure. Wireless speaker package 700 includes an enclosure 710. On the enclosure 710 there resides a graphical interface 712 (e.g., an OLED display) which can provide the user with information regarding currently playing ("Now Playing") music. There are one or more electro acoustic transducers 715. Wireless speaker package device 700 also includes a user input interface 716. The user input interface 716 can include a plurality of preset indicators, which can be hardware buttons. The preset indicators can provide the user with easy, one press access to entities assigned to those buttons. The assigned entities can be associated with different ones of the digital audio sources such that a single wireless speaker package 700 can provide for single press access to various different digital audio sources.

Wireless speaker package 700 also includes a network interface 720, a processor 722, audio hardware 724, power supplies 726 for powering the various components, and memory 728. Each of the processor 722, the graphical interface 712, the network interface 720, the audio hardware 724, the power supplies 726, and the memory 728 are interconnected using various buses, and several of the components may be mounted on a common motherboard or in other manners as appropriate.

The network interface 720 provides for communication between the wireless speaker package 700 and audio sources and other networked wireless speaker packages and other audio playback devices via one or more communications protocols. The network interface 720 may provide either or both of a wireless interface 730 and a wired interface 732. The wireless interface 730 allows the wireless speaker package 700 to communicate wirelessly with other devices in accordance with a communication protocol such as IEEE 802.11 b/g. The wired interface 732 provides network interface functions via a wired (e.g., Ethernet) connection.

In some cases, the network interface 720 may also include a network media processor 734 for supporting Apple AirPlay® (a proprietary protocol stack/suite developed by Apple Inc., with headquarters in Cupertino, Calif., that allows wireless streaming of audio, video, and photos, together with related metadata between devices). For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device.

All other digital audio coming from network packets comes straight from the network media processor 734 through a USB bridge 736 to the processor 722 and runs into the decoders, DSP, and eventually is played back (rendered) via the electro-acoustic transducer(s) 715.

The network interface 720 can also include a Bluetooth circuitry 738 for Bluetooth applications (e.g., for wireless communication with a Bluetooth enabled audio source such as a smartphone or tablet).

Streamed data passes from the network interface 720 to the processor 722. The processor 722 can execute instructions within the wireless speaker package (e.g., for performing, among other things, digital signal processing, decoding, and equalization functions), including instructions stored in the memory 728. The processor 722 may be implemented as a chipset of chips that include separate and multiple analog and digital processors. The processor 722 may provide, for example, for coordination of other components of the audio playback device 700, such as control of user interfaces, applications run by the audio playback device 700. A suitable processor is the DA921 available from Texas Instruments.

The processor 722 provides a processed digital audio signal to the audio hardware 724 which includes one or more digital-to-analog (D/A) converters for converting the digital audio signal to an analog audio signal. The audio hardware 724 also includes one or more amplifiers which provide amplified analog audio signals to the electroacoustic transducer(s) 715 for playback. In addition, the audio hardware 724 may include circuitry for processing analog input signals to provide digital audio signals for sharing with other devices.

The memory 728 may include, for example, flash memory and/or non-volatile random access memory (NVRAM). In some implementations, instructions (e.g., software) are stored in an information carrier. The instructions, when executed by one or more processing devices (e.g., the processor 722), perform one or more processes, such as those described elsewhere herein. The instructions can also be stored by one or more storage devices, such as one or more computer- or machine-readable mediums (for example, the memory 728, or memory on the processor). The instructions may include instructions for performing decoding (i.e., the software modules include the audio codecs for decoding the digital audio streams), as well as digital signal processing and equalization. Additional details may be found in U.S. Patent Application Publication 2014/0277644, the disclosure of which is incorporated herein by reference.

Figure 3:
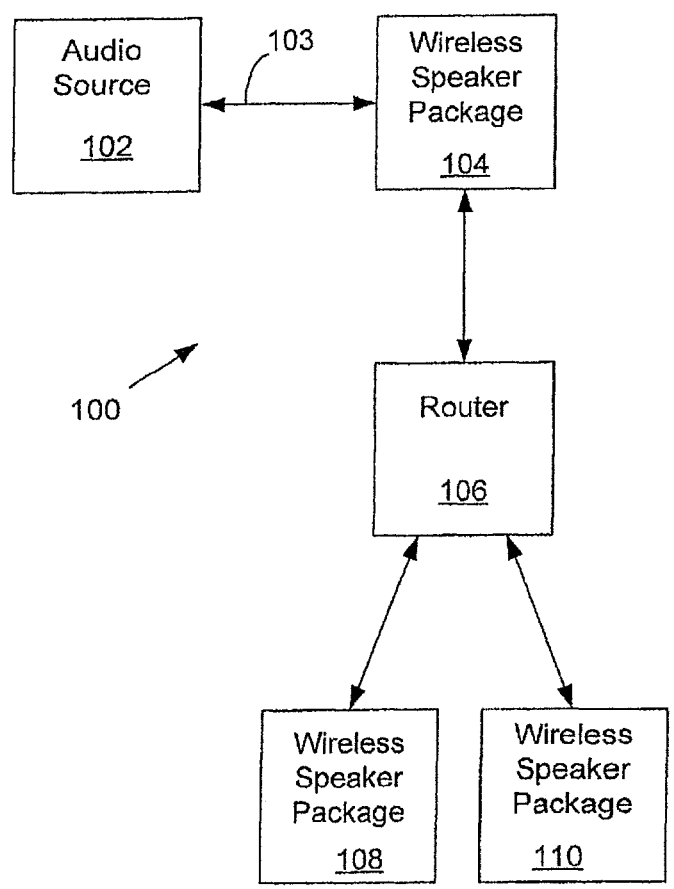
FIG. 3 is a schematic block diagram of a wireless interconnection of an audio source and several wireless speaker packages using a wireless access point.

Audio system 100, FIG. 3, can be used for the wireless audio synchronization herein. System 100 includes audio source 102 that communicates with wireless speaker package 104 over wireless network 103. Network 103 may be a Bluetooth network, or it may use any other wireless communication network protocol now known or hereafter developed that does not provide a means to synchronize an audio source and an audio sink. Although the wireless audio synchronization herein does not require more than one wireless speaker package as part of system 100, system 100 can include additional wireless speaker packages 108 and 110. Normally but not necessarily, in the case where there are multiple wireless speaker packages that are part of system 100, one wireless speaker package (wireless speaker package 104 in this case) functions as the master device and the other wireless speaker packages (108 and 110 in this case) function as the slave wireless speaker packages. Master device 104 receives audio data from source 102 and distributes it to slaves 108 and 110. In this non-limiting example such audio distribution can be by WiFi via wireless access point/router 106, but distribution could be by any other wireless or wired network protocol. Each of wireless speaker packages 104, 108 and 110 will play the audio. The audio replay among the wireless speaker packages can be (but need not be) synchronized such that they all play the same audio at the same time; this is further described below.

The Bluetooth standard does not provide a means to synchronize or rate-match the clocks in audio source 102 and audio sink (e.g., wireless speaker package) 104. Bluetooth sources vary dramatically in their data rate, packet size, and duration of audio per packet. The RF environment can also contribute to variation in audio data packet arrival times at the wireless speaker package 104. The latency of playback of audio data by wireless speaker package 104 (or another type of Bluetooth audio sink) can be minimized by allowing the latency to vary based on the difference between the time it takes for source 102 to send audio packets and the time over which these audio packets are received by wireless speaker package 104. The variation of the latency can be based on the difference in the time it takes to send audio data packets compared to the time it takes to receive these packets. This way, when jitter is low there is low latency and when jitter increases the latency increases. For networked systems with multiple audio sinks, wireless speaker package 104 time stamps the audio packets, before they are sent to slaves 108 and 110. This way, all of the wireless speaker packages can play back the audio synchronously.

Wireless speaker package 104 time stamps with the time of receipt, each audio data packet it receives from source 102, where the receive time stamp represents a local time on the wireless speaker package when the associated one of the individual data packets was received by the wireless speaker package. This is done whether or not source 102 time stamps the audio data packets with the time they are sent over network 103. As part of the current Bluetooth protocol, audio data packets are time stamped by audio source 102. Such time stamping allows the processor of wireless speaker package 104 to compare the time period over which audio data (e.g., one or more packets of audio data) was sent by source 102 to the time period over which this same audio data was received by wireless speaker package 104. The comparison that is accomplished by wireless speaker package 104 may be a function of these two time periods. The function may be the ratio of the two time periods, or it could be another function such as but not limited to a linear model or an adaptive learning algorithm. In the absence of time stamps from source 102, the system can utilize the decoded samples to estimate the time when data was sent by source 102. The comparison of receive time to send time is in essence a measure of the time between the receipt of two packets. Other measures could be used, such as the time to send and receive multiple contiguous packets.

Wireless speaker package 104 uses the results of this comparison (e.g., the above-described ratio) to establish the time period over which audio packets are played by wireless speaker package 104. In one example, the playback time period is based on the ratio of the time period over which audio data was received by wireless speaker package 104 (which is a measure of jitter) to the time period over which this same audio data was sent by source 102, applied to the length of the audio data packets. For example, if a packet length is 20 milliseconds (mS) and three packets are received over 61.2 mS, the above ratio is 61.2/(3×20) or 1.02 (i.e., a 2% delay/jitter). The playback time period in this example can then be established as 20 mS×1.02, or 20.4 mS. A sync sub-system of the wireless speaker package feeds packets to a rate matching algorithm (e.g., an asynchronous sample rate converter (ASRC)) over the established playback time period such that each packet is replayed by the wireless speaker package over the established playback time period.

The comparison thus establishes a latency, which also dictates the depth of the ring buffer used to buffer the data. The latency is set by this comparison. Since the comparison (e.g., the ratio) is accomplished continuously as data packets are received, the latency can change as needed, e.g., to account for changes in jitter. For example, if any delay in receipt of data packages is tending to increase, the ratio will increase, which causes the data packet playback time to increase accordingly. On the other hand, if any delay in receipt of data packages is tending to decrease, the ratio will decrease, which causes the data packet playback time to decrease accordingly. The comparison thus dynamically modifies the latency to account for the current conditions of the source, the RF environment, and the sink, while minimizing the latency to the extent feasible. In cases in which the amount of audio data does not inherently fill the amount of time designated for playback of that data, or there is more data than can be played in the playback time, a smoothing function is used to reduce audio artifacts. For example, extra data can be interpolated (reduced), or some data can be extrapolated (stretched) so that the available data fills the time period over which audio packets are played. On occasions when the variations between the second time stamps exceed the buffered audio duration, the target latency (buffer depth) can be adjusted to help ensure that sufficient audio data is present (avoid underflow). Similarly, when variations between the second time stamps are sufficiently low, the buffer depth can be decreased to enhance the audio for video synchronization.

When there are additional slave wireless speaker packages connected to the master that receives the audio data from the audio source, the master's audio decoding subsystem re-encapsulates each audio packet and time stamps them. When these data packets are sent by the master to the slaves, they are played based on the time stamps. This feature allows all of the wireless speaker packages to playback the audio in a synchronized manner if this is desired by the user.

The slave devices may be synched to the master using a clock synchronization algorithm that keeps the current clock time on all of the slave devices synchronized with that of the master device. The clock synchronization algorithm is separate and aside from the audio stream. The clock synchronization algorithm clock data is provided every 1 to 6 seconds to keep the slave devices updated and in sync with the master. Separately, the master device provides a "play at" time to the slave devices. This "play at" time represents the time that the devices are to start playing a first sample in an audio stream. The "play at" time is communicated in control data that is separate from the audio stream and is only sent once for each track (i.e., it is not included with every frame). Every new track or stream will get a new "play at" time.

The slave devices receive the first sample in a stream and begin playback at the designated "play at" time. Since all devices have the same current clock time, due to the clock synchronization algorithm, they all begin playback at the same time. From there, the devices all provide playback at a constant sample rate, and, consequently, stay in sync.

The oscillators on the individual devices may spin at different rates, which could lead to time drift among the devices. Synchronization adjustments to the clock time may cause the duration of audio that the corresponding slave device needs to play to stay in sync to either grow or shrink. An ASRC on board each audio device accounts for these time adjustments and manipulates the received audio data to ensure a constant sample output rate.

The master device adds a time stamp to the header of each frame in the audio stream that represents a time offset from the "play at" time—i.e., the time difference between the time when playback of the corresponding frame should start and the "play at" time. Unlike the "play at" time and the clock data, this time stamp is provided in the audio stream. This time stamp is used by the slave devices for determining when the corresponding frame is fed into the ASRC. This time stamp is based on a comparison of the first and second time stamps to those of previously-received frames. The third time stamp that is added to the header of each frame roughly corresponds to a time (some point in the future which takes into consideration the latency) when the associated frame is to be fed into the ASRC. This third time stamp is actually a time offset. i.e., it is some delta from an initial start time (i.e., "play at" time) of the playback of the audio.

The latency can be in part a function of the particular audio source. For example, different audio source devices may have different data rates, packet sizes, duration of audio per packet, and inter-packet send times. Also, the RF frequency used and the device's WiFi/Bluetooth coexistence strategy can cause variation in latency. In order to facilitate establishing a minimum effective latency when a source device has previously been paired with the wireless speaker package, the wireless speaker package memory can store the latest latency status for previously paired source devices. The latest latency status that is stored can be values that can be used by the processor to compute the third time period using the function described above and the current values of the first and the second time periods, when the device is reconnected. When such a source device has been disconnected from the network and is then later re-connected, the wireless speaker package can use the stored latency status to compute the initial latency. The variable latency system described herein can then modify the initial latency as necessary, to account for the current actual latency. By using a per-device learned latency status versus a fixed, one-size fits all latency value, audio artifacts due to high variation in packet arrival are avoided. Conversely, when variations in packet arrivals are low, using a per-device learned latency status allows the system to enhance the audio-video synchronization experience.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A computer program product having a non-transitory computer-readable medium including computer program logic encoded thereon that, when performed on an audio sink, causes the audio sink to:
   store a distinct value that can be used by the audio sink to determine a time period for the playback by the audio sink of audio data that is wirelessly transmitted from an audio source to the audio sink; and
   play audio data over the determined time period.

2. The computer program product of claim 1, wherein the distinct value is based on a time period over which audio data was sent by the audio source to the audio sink and a time period over which this same audio data was received by the audio sink.

3. The computer program product of claim 2, wherein the distinct value is determined as a function of the time period over which audio data was sent by the audio source to the audio sink and the time period over which this same audio data was received by the audio sink.

4. The computer program product of claim 3, wherein the function comprises a ratio of the time period over which audio data was sent by the audio source to the audio sink and the time period over which this same audio data was received by the audio sink.

5. The computer program product of claim 4, wherein the audio data is transmitted by the audio source to the audio sink as data packets that have a time-based length, and the determined time period is based on the ratio applied to the length of data packets.

6. The computer program product of claim 3, wherein the function comprises a linear model.

7. The computer program product of claim 3, wherein the function comprises an adaptive learning algorithm.

8. The computer program product of claim 2, wherein the time period over which audio data was sent by the audio source to the audio sink and the time period over which this same audio data was received by the audio sink are based on a time value provided by the audio source.

9. The computer program product of claim 8, wherein the time period over which audio data was sent by the audio source to the audio sink and the time period over which this same audio data was received by the audio sink are further based on the time of receipt of the audio data by the audio sink.

10. The computer program product of claim 2, wherein the time period over which audio data was sent by the audio source to the audio sink and the time period over which this same audio data was received by the audio sink are based on the audio data that was wirelessly transmitted from the audio source to the audio sink.

11. The computer program product of claim 10, wherein the audio data is transmitted as encoded data packets and the encoded data packets are decoded by the audio sink.

12. The computer program product of claim 11, wherein a time when the audio data was sent by the source is estimated based on the decoded data packets.

13. The computer program product of claim 1, wherein the computer program product further causes the audio sink to use the stored distinct value to determine the time period by, after the audio source has been disconnected from the audio sink and then reconnected to the audio sink, determining an initial latency for the playback of audio data by the audio sink based on the stored distinct value.

14. The computer program product of claim 13, wherein the time period is based on the determined initial latency.

15. The computer program product of claim 14, wherein the computer program product further causes the audio sink to modify the initial latency to account for a current actual latency.

16. The computer program product of claim 1, further comprising storing another distinct value that corresponds to another previously paired audio source.

17. The computer program product of claim 16, wherein the other distinct value can be used by the audio sink to determine another time period for the playback by the audio sink of audio data that is wirelessly transmitted from the other previously paired audio source to the audio sink.

18. The computer program product of claim 17, wherein audio data from the other previously paired audio source is played over the other determined time period.

19. A wireless speaker package, comprising:
an electro-acoustic transducer;
a processor; and
memory comprising instructions which when executed by the processor cause the wireless speaker package to:
store a distinct value that can be used by the wireless speaker package to determine a time period for the playback by the wireless speaker package of audio data that is wirelessly transmitted from an audio source to the wireless speaker package; and
play audio data over the determined time period using the electro-acoustic transducer.

20. The wireless speaker package of claim 19, wherein the distinct value is based on a time period over which audio data was sent by the audio source to the wireless speaker package and a time period over which this same audio data was received by the wireless speaker package.

* * * * *